Feb. 13, 1962 C. F. MATTKE ET AL 3,021,428

RADIANT-ENERGY TRANSLATION SYSTEM

Filed Aug. 23, 1947 3 Sheets-Sheet 1

INVENTORS: C. F. MATTKE
F. W. REYNOLDS

BY G. H. Heydt

ATTORNEY

Feb. 13, 1962 C. F. MATTKE ET AL 3,021,428

RADIANT-ENERGY TRANSLATION SYSTEM

Filed Aug. 23, 1947 3 Sheets-Sheet 2

INVENTORS C. F. MATTKE
F. W. REYNOLDS

BY G. H. Heydt

ATTORNEY

ON TARGET IN ELEVATION

ON TARGET IN ELEVATION AND AZIMUTH

SWEEP GENERATOR NOT PROPERLY PHASED

OFF TARGET SIGNAL

ON TARGET SIGNAL

ON TARGET SIGNAL

SIGNAL OFF TARGET IN ELEVATION

INVENTORS: C. F. MATTKE
F. W. REYNOLDS
BY G. H. Heydt
ATTORNEY

United States Patent Office 3,021,428
Patented Feb. 13, 1962

3,021,428

RADIANT-ENERGY TRANSLATION SYSTEM

Charles F. Mattke, Jackson Heights, N.Y., and Frederick W. Reynolds, Ridgewood, N.J., assignors to Bell Telephone Laboratories, Incorporated, New York, N.Y., a corporation of New York Filed Aug. 23, 1947, Ser. No. 770,248
10 Claims. (Cl. 250—83.3)

This invention relates to radiant-energy systems, and particularly to thermal-energy responsive systems.

An object of the invention is to provide an improved thermal-energy reception system.

Another object is to provide a radiant-energy detection system adaptable to scan in elevation and azimuth.

A further object is to provide a detection system competent to obtain, in a limited time, the bearings of a fast moving body.

Various other objects and uses of the invention will be apparent from a study of the specifications and drawings.

The system according to the invention may utilize that form of radiant-energy which is classified under the general title of thermal-energy radiation, and which includes visible light, ultra-violet and infra-red waves. In the preferred form of the invention infra-red radiation of a wavelength between 7,000 and $4\times10^6$ angstrom units is utilized. It will be understood that the system, and particularly the scanning mechanism, is adaptable for other forms of radiant-energy.

In the preferred embodiment of the invention an infra-red responsive system is designed to respond to the difference in thermal-energy radiation which usually exists between a target and its surroundings. The equipment may scan an area under observation and collect and process thermal-energy received from the area. When in the course of the scanning operation an object is encountered having a thermal-diffusiveness greater or less than that of the area of scan per se, a temperature-discontinuity or anomaly exists and a target signal is initiated. When the apparatus is not in correct alignment with the object, the signal indicates the direction in which the equipment should be moved in order to bring it into correct orientation. The signal also indicates when the equipment is in directional alignment with the object. By utilizing a number of interchangeable thermal-sensitive devices, a variety of types of signal indications are readily available. The system may also be used to control any suitable automatic mechanism for holding the scanning apparatus in constant orientation with the direction of a thermal-energy source.

Any element sensitive to thermal-energy radiations may be utilized as a responsive element in the invention. Examples of such sensitive elements are thermocouples, thermopiles, photocells and bolometers. In the preferred embodiment of the invention a thermistor-bolometer is utilized. A bolometer is a device which is used to detect or record small quantities of thermal energy by means of a thermally-induced change in the bolometer resistance. Thermistors may be manufactured in any suitable manner such as that shown in United States Patent 2,414,793, issued January 28, 1947, to J. A. Becker and H. Christensen. Suitable materials for the construction of thermistors are one or more of the oxides of manganese, nickel, cobalt, zinc or uranium. Some thermistors possess negative temperature coefficients and are responsive to minute temperature changes, and usually their resistance decreases as their temperature increases. The temperature coefficients of resistance possessed by thermistors are usually ten times greater than the coefficients of metals, and consequently a result may be obtained, by using thermistor-bolometers, which is ten times greater than if the same temperature change were observed with those bolometers which utilize pure metals as their sensitive elements. Another advantage is the fact that the thermistor-bolometer resistance, per individual unit, is about one megohm, and accordingly thermistors have a suitable impedance for direct connection to the grid circuit of a vacuum tube, while metal bolometers usually require use of step-up transformers. A method of utilizing these characteristics of thermistors comprises placing them in a circuit so as to form arms of a bridge configuration. Radiation impinging upon a thermistor bridge arm changes its temperature with a resultant change in its resistance. The change in resistance value causes an unbalance in the bridge circuit, and a resultant potential variation across the bridge. This potential is amplified and utilized to energize signal indication equipment.

In one embodiment of the invention a flat scanning reflector is mounted on a shaft at an acute angle with reference to the shaft axis, and with an additional tilt component at right angles to the original acute angular displacement. The shaft is supported for rotation in a rocking bearing and while rotating a vibratory displacement of the axis of the shaft occurs, so that the reflector elliptically scans an area. Thermal-energy collected by the reflector is projected upon a fixed parabolic reflector, the focal plane region of which, contains a thermal-energy responsive element which initiates voltage variations, corresponding to variations in the intensity of the thermal-energy received. These variations are transmitted, via an amplifier to the deflector electrodes of a cathode-ray oscilloscope. The horizontal sweep of the oscilloscope beam is controlled by impulses which are originated by rotation of the shaft supporting the scanning reflector.

The motion of the scanning apparatus is such as to intermittently focus upon either of the two sensitive sections of the thermal-energy responsive element, a thermal-image of a target. The thermal-image travels along a pathway which has the form of a narrow ellipse, and the ellipse minor axis is parallel to the lengthwise axis of the element. When the thermal-image impinges upon one section which is positively poled a positive pulse is produced, and when it impinges upon the other section a negative pulse is produced. These pulses may be used to synchronize the sweep circuit source, and also to produce indications on the oscilloscope screen to show when the scanning system is properly oriented with respect to the source of incoming thermal-energy which produces the pulses.

Referring to the drawings.

Figure 1:
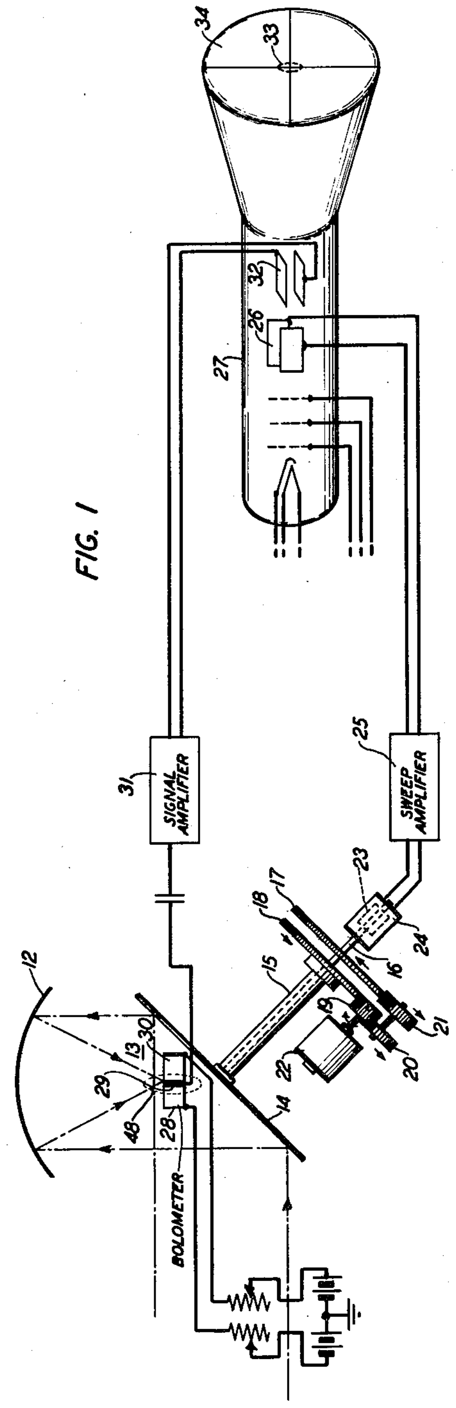
FIG. 1 is a schematic diagram of an embodiment of the invention.

Referring to FIG. 1, a parabolic reflector 12 and a bolometer 13 are mounted in fixed positions in any suitable manner as shown. In front of reflector 12 is a flat scanning reflector 14 adaptable for rotation. The reflector 14 is mounted upon a rotatable hollow shaft 15. Within the hollow shaft 15 is a flexible drive shaft 16. A portion of the drive shaft 16 passes through the hub of a gear 17 and is secured to the gear. The shaft 16 is motivated through a gear chain mechanism, which includes gears 17, 18, 19, 20 and 21, by a motor 22. One end of drive shaft 16 is connected to the reflector 14 while its other end is connected to a rotor 23 of an alternating current sweep circuit generator 24. The output from the generator 24 is fed to a sweep circuit amplifier 25, and the output from the amplifier 25 is connected to horizontal deflection plates 26 in an oscilloscope system 27. In the bolometer 13 is a thermistor element which is electrically partitioned into three sections 28, 29 and 30. Sections 28 and 30 are sensitive to impinging radiations while central section 29 is shielded from radiations and is inert. For purposes of illustration the view of the thermistor element is distorted since the surface shown in the drawing as facing the observer actually faces the parabolic reflector 12. The sections 28 and 30 are biased from a direct current source and form arms of a normally balanced bridge network as illustrated. Radiation received by the reflector 14 from the area of scan is directed upon the parabolic reflector 12 which focusses it upon the sections 28 and 30 of the bolometer unit 13. Variations in the thermal-energy received by these sections result in a voltage potential at the central section 29. This varying voltage potential output from the thermistor-element configuration is led to an amplifier 31, and the amplified output is connected to vertical deflection plates 32 in the oscilloscope 27. Through resolving the outputs of devices 13 and 24 in the oscilloscope 27, a signal indication 33 appears on the screen 34, in a manner which shall be described in detail.

Figure 2:
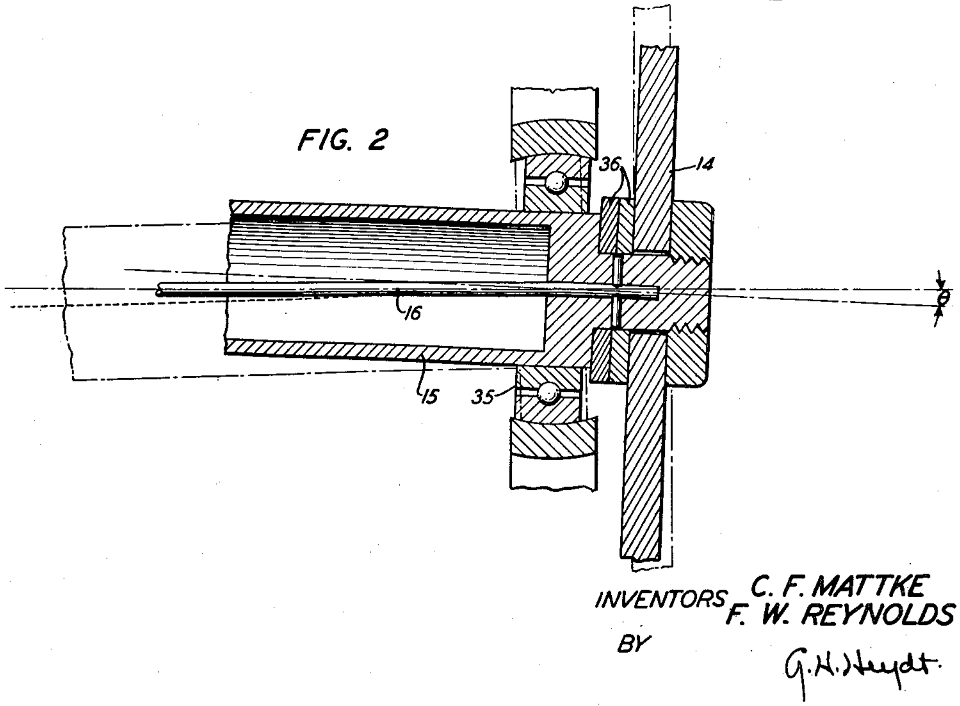
FIG. 2 is a detail of the mounting of the flat scanning reflector shown in FIG. 1.

Referring to FIG. 2, there is shown a detail of the mounting of the flat reflector 14 upon the hollow shaft 15. Reflector 14 is mounted upon the shaft 15 at an acute angle in relation to the longitudinal axis of shaft 15. This acute angle is about three-quarters of a degree less than ninety degrees, and is designated angle $\theta$ as illustrated. An end of the shaft 15 revolves in a pivot type of bearing 35. A pair of thin washers 36 are so tapered in thickness from one side toward the other than rotation of one washer in a clockwise direction, and of the other washer in a counter-clockwise direction, will change the tilt of reflector 14 without adding a skew to its rotation movement. Flexible driving shaft 16 passes through the hollow reflector shaft 15 and is secured to the reflector 14 as shown.

Figure 3:
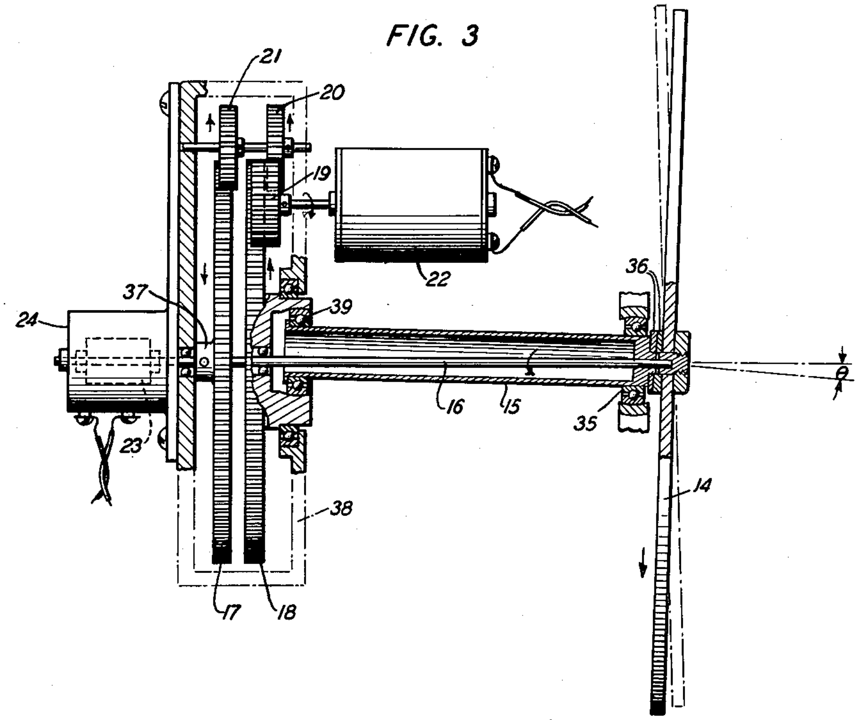
FIG. 3 is another detail view of the reflector of FIG. 2 and shows its driving mechanism and an associated phase generator.

FIG. 3 shows details of the driving mechanism of reflector 14 and the hollow shaft 15. The flexible drive shaft 16 passes through the hub of the gear 17 and is secured thereto by a set-screw 37. An end of the drive shaft 16 is connected to the rotor 23 of the generator 24, while the other end of the shaft is secured to the reflector 14. The gear chain mechanism contained within the gear case 38, and comprising gears 17, 18, 19, 20 and 21, is driven by the motor 22. An end of the hollow shaft 15 rests in a pivot bearing 35, while its other end is held in a bearing 39 which is eccentrically mounted with respect to the axis of the shaft 15. The bearing 39 is secured to the gear 18 as shown. When the motor 22 actuates the gear chain within the gear case 38, the eccentrical mounting of an end of hollow shaft 15 in the bearing 39, causes this end to nutate in a circular pathway with its front end pivoted in the bearing 35. The rotating movement imposed upon drive shaft 16 by the gear 17 is in turn imposed upon the hollow shaft 15. It will be noted that the movement of an end of the hollow shaft 15, and the rotational movement of shaft 15, are in opposite directions but at the same rate of speed since they are interconnected by the gear chain mechanism to a common driving agency 22. Both of the motions imposed upon the shaft 15 are therefrom imposed upon the reflector 14. This double-action imposition upon reflector 14 will result in the reflector scanning a straight line path with a simple superimposed harmonic motion. The reflector actually scans elliptically, and this elliptical scan effect is achieved and obtained from the straight line scan by tilting the reflector 14, by means of the tapered washers 36, so that it has an extra small component of tilt at right angles to its original tilt displacement in relation to the hollow shaft 15. In one embodiment of the invention, wherein elevation information is primarily desired, it is possible to cover a field of scan that has a ratio of twelve to one, as for example, six degrees in elevation and a half degree in azimuth. By a simple transposition of gears in the gear case 38 the condition may be reversed and a scan of a half degree in elevation and six degrees in azimuth becomes readily available. To effect this change of the direction of scan from vertical to horizontal it is necessary to rotate the gears with respect to the gear case 38 as follows. The idler gear 21 is removed, and gears 17 and 18 are rotated together through a ninety-degree arc with respect to the gear case 38, and the idler gear 21 is then replaced in position. The associated oscilloscope scan line may be changed from vertical to horizontal and the connections to the deflection plates also interchanged.

Figures 4, 5, 6:
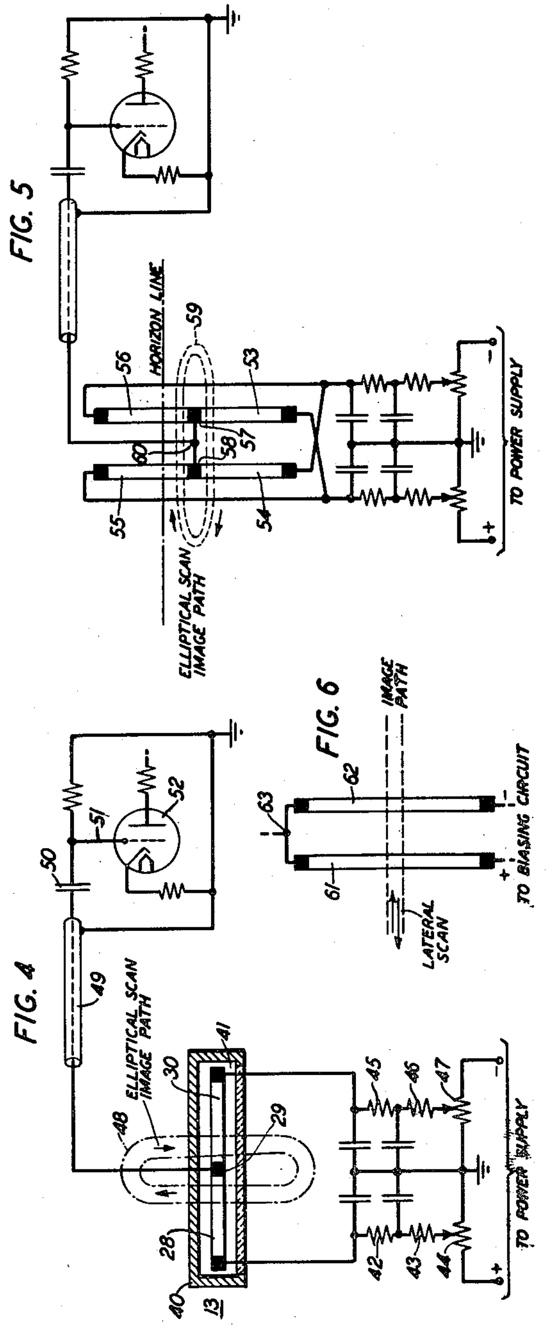
FIG. 4 is a schematic representation of a bolometer as used in FIG. 1 together with a biasing circuit and connections to an associated amplifier.
FIG. 5 shows an alternate type of bolometer which may be used in place of the configuration shown in FIG. 4.
FIG. 6 shows another alternate type of bolometer which may be used in place of that shown in FIG. 4 and which is adaptable for use with a linear scan.

Referring to FIG. 4 there is shown a bolometer unit 13 comprising a housing 40 with a window 41 situated therein. Within the housing 40 and behind the window 41 is a thermistor-element strip which is electrically partitioned into three sections 28, 29 and 30. The element strip is shielded from radiations by the housing 40, except the front surfaces of the sensitive sections 28 and 30 which are exposed. Infra-red radiation may enter through the window 41 and impinge upon the front surfaces of the sensitive sections 28 and 30. Section 29 is inert and shielded from thermal-energy emissions as stated. Electrical contacts are secured to the center of the section 29, and to both of the element extremities as shown. Sections 28 and 30 are connected to a direct current biasing circuit, as illustrated, so as to form arms of a bridge configuration, other arms of which include resistances 42, 43 and 44 also resistances 45, 46 and 47. Bridged across the bridge are a series of condensers, and one plate of each condenser is connected to ground. A direct current electromotive force is applied to the network and a balance may be achieved by adjusting the balancing rheostats 44 and 47. It will be noted that sections 28 and 30 are now oppositely poled and are connected together by shielded non-responsive section 29. When the device is in use the window 41 of the bolometer 13 faces the axis of the parabolic reflector. The thermal image formed on the parabolic reflector from the flat scanning reflector, as discussed, is focussed by the parabolic reflector upon the thermistor-element strip in the bolometer 13. As the thermal image impinges upon sections 28 or 30, positive or negative pulses will originate. Due to the combined tilt and rotational nutational movements of the flat reflector, as discussed, the thermal image from the parabolic reflector will describe an elliptically shaped pathway 48 in its movement upon, across and around the bolometer 13, and will alternately and consecutively impinge upon sections 28 and 30. No part of the target thermal image impinges upon the inert section 29. The object thermal image pathway is in the form of the narrow ellipse 48, with the ellipse minor axis parallel to the thermistor element length. The magnitude of the minor axis is adjustable by means of the tapered washers, discussed in relation to FIGS. 2 and 3, so that when the system is directionally aligned with a target in train no part of the thermal image will impinge upon the inert section 29. As the thermal image impinges upon an exposed sensitive section the temperature of the section increases with a corresponding increase in the section resistance. This momentary change in resistance unbalances the bridge network and initiates a voltage variant across the bridge between the central section 29 and ground. This central common connecting point is connected through a shielded cable 49, and a blocking condenser 50 to a grid 51 of an amplifying device 52. Thence the amplified pulses are led to either the vertical or horizontal deflecting plates of an oscilloscope system, as discussed in relation to FIG. 1, and are phased with the output of the phase generator so that pulses occur in space alignment on two sides of the oscilloscope sweep base line.

The cable 49 may comprise a shield imposed over a polystyrene insulated conductor the ends of which are coated with ceresin wax. This maintains the high insulation resistance of the bolometer sections and of the input circuit, and tends to minimize resistance variations other than those caused by legitimate signals. This shielding treatment is also successful in preventing the absorption of water vapor which might form a conducting film across the high resistance input leads.

In FIG. 5 there is shown a double element strip which may be substituted for the configuration shown and discussed in relation to FIG. 4. Each element is electrically divided into three sections of which sections 53, 54, 55 and 56 are sensitive, and sections 57 and 58 are inert. As the thermal image, following its elliptically shaped pathway 59, crosses strips 53 and 54 it originates positive and negative pulses, and on its return trip, across the sections 55 and 56, originates positive and negative pulses in a manner discussed in relation to FIG. 4. The common connection point 60 joining the four sensitive sections is connected to the grid of an amplifier as shown.

FIG. 6 shows a dual element configuration composed of elements 61 and 62 which may be biased from a direct current source, and which have a common connection point 63 connecting to an amplifier as discussed in relation to FIG. 4. This arrangement is adapted for use with a lateral scan. As the thermal image passes back and forth across the sections 61 and 62 positive and negative pulses are initiated and processed as discussed above.

In order to have available the various advantages of the individual bolometer configurations described, a simple plug-in interchangeable bolometer is adaptable for use in the system. This bolometer may have the associated sensitive elements prealigned in manufacture.

Figure 7:
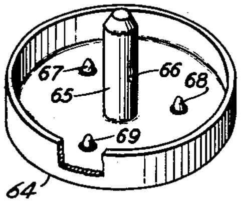
FIG. 7 shows the rear view of an interchangeable plug-in type bolometer for use with the configurations shown in FIGS. 4, 5 and 6.

Referring to FIG. 7 there is shown a rear view of an interchangeable bolometer. This comprises a housing 64 with a plug-in positioning shaft 65 upon which there is a positioning pin 66. On the rear of the housing 64 are three contacts 67, 68 and 69 for the necessary electrical connections to thermistor strips within the housing. One of these contacts connects to the inert common connection section, while the other two contacts furnish positive and negative points of contact for the electromotive force biasing the sensitive sections. The shaft 65 is adaptable for contact with any suitable receptacle, and the alignment or positioning pin 66 assures correct placement of the unit in its receptacle. When the unit is seated in its receiving socket the bolometer strips are positioned in correct focus.

In order to secure accurate signals it is desirable that the sensitive sections within the bolometer have substantially equal responses. An adjusting means to achieve balance between the various active sensitive sections is shown in FIG. 8.

Figure 8:
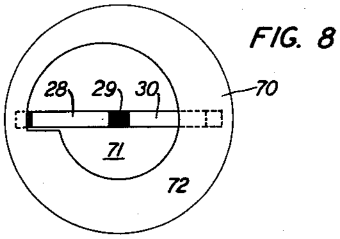
FIG. 8 shows a balancing device for use with the plug-in unit of FIG. 7.

Referring to FIG. 8, there is shown a cap or masking device 70 adaptable for fitting over the front end of the unit shown in FIG. 7. Cap 70 is shown in relation to a three-section thermistor-element, comprising two active sections 28 and 30 and an inert section 29, similar to that discussed in relation to FIG. 4. Cap 70 has a spiral-shaped aperture 71, and a spiral-shaped masking surface 72. If there is an unbalance between the sensitive sections 28 and 30, this unbalance condition may be overcome by rotating the cap 70 so that a part of either section 28 or 30 is obscured by the spiral-shaped masking surface 72.

FIGS. 9, 10 and 11 show a variety of types of signal indications registered by the equipment while using different types of bolometers, and when operated under different scanning conditions.

Figure 9A:
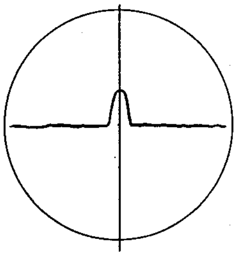
FIGS. 9A, 9B show types of signal indications appearing upon the screen of an oscilloscope when the bolometer configuration shown in FIG. 4 is used.
Figure 9B:
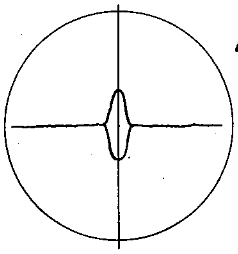

Referring to FIGS. 9A and 9B there is shown the type of signal recorded upon the oscilloscope screen when utilizing a bolometer containing the element configuration shown and discussed in relation to FIG. 4. If the target is incorrectly centered by the equipment, a signal is recorded similar to that shown in FIG. 9A, wherein the equipment is correctly aligned with the target in elevation, but incorrectly positioned in azimuth. When the target is correctly centered both in elevation and in azimuth, a small diamond-shaped open area similar to that shown in FIG. 9B appears upon the oscilloscope screen.

Figure 10A:
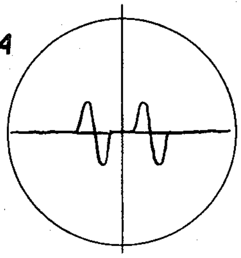
FIGS. 10A, 10B, 10C show types of oscilloscope signal appearances when the bolometer configuration shown in FIG. 5 is utilized.
Figure 10B:
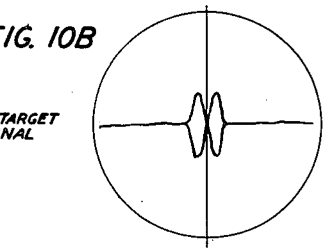
Figure 10C:
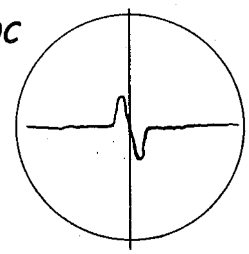

Referring to FIGS. 10A, 10B and 10C there are shown the types of signals recorded upon the oscilloscope screen when utilizing a bolometer containing an element similar to that shown and discussed in relation to FIG. 5. FIG. 10A shows the signal recorded when the output of the phasing generator is not properly in phase with the signal pulse pips. When the equipment is in directional alignment with the target in both elevation and azimuth, a signal similar to that shown in FIG. 10B is recorded. If the target is not correctly centered in elevation a signal similar to that shown in FIG. 10C appears.

Figure 11A:
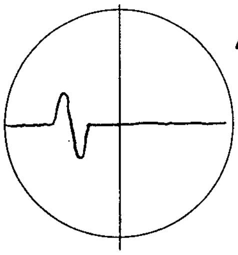
FIGS. 11A and 11B show oscilloscope signal appearances when the bolometer configuration of FIG. 6 is used.
Figure 11B:
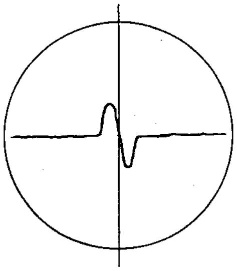

Referring to FIGS. 11A and 11B, there are shown types of signals received when a bolometer containing an element similar to that shown and discussed in relation to FIG. 6 is used with a lateral scan effect. FIG. 11A shows a signal indicating the fact that the target is incorrectly centered. FIG. 11B shows the type of signal recorded when the system is in directional alignment with the target in elevation and in azimuth.

Numerous advantages accrue from use of the multi-section element configurations when used with the elliptical scan effect. For example, when the equipment is used to scan a distant area a large signal is usually obtained in scanning across the horizon, and the boundary area between sky and water bodies will usually originate a large signal. This interfering signal can present a problem, when for example an observer is trying to detect low flying aircraft, since the extraneous signal from the sky and water tends to mask the legitimate signal from the aircraft. In the system as used in the invention and as illustrated in FIG. 5, the boundary horizon area crosses both sections of the element simultaneously, and the signals from the two sections being of opposite polarity will tend to cancel out each other thus facilitating the reception of legitimate signals. Another advantage of this method of detection is the fact that, when the equipment is accurately pointed at a target, a distinctive signal envelope is obtained upon the oscilloscope screen and can be readily distinguished from a noise signal. Due to this fact it is possible to detect the presence of a signal even though the signal has the same amplitude as peak random noise.

The amplifiers used in the system are such as are well known to those skilled in the art. The amplifier tubes should be carefully selected so as to have low flicker noise and an absence of microphonics.

It will be understood that the specific embodiment of the invention as shown and described herein is illustrative, and that various modifications may be made thereof without departing from the scope and spirit of the invention as defined in the following claims.

What is claimed is:

1. In a radiant-energy scanning system, for elliptically scanning an area to detect a temperature anomaly situated therein the combination of, a multisectioned element electrically sensitive to radiant-energy the sections of which form arms of a bridge network, means for collecting radiant-energy from said area and focussing it upon said element, said means comprising a plane reflector for scanning said area and collecting radiant-energy emanating therefrom, a rotatable shaft, means for rotating said shaft, said plane reflector mounted upon said shaft at an acute angular displacement in relation to the shaft, means for obtaining a rotary conical displacement of said shaft as said shaft revolves, said rotary conical displacement direction being in an opposite direction to the shaft rotation, a parabolic reflector situated so as to receive the collected radiant-energy from said plane reflector and direct it upon said element, means for originating an electromotive output corresponding to variations in the amounts of radiant-energy impinging upon said element, means for generating an alternating current in fixed time relation with said output, an indicating device, and means for feeding said electromotive output and said alternating current to said device so as to establish indications of the relative positions of said anomaly and said scanning system.

2. In a thermal-energy detection system, for elliptically scanning an area to detect the position of a temperature anomaly situated therein the combination of, a parabolic reflector, means for causing a thermal image of said anomaly to impinge upon said parabolic reflector, said means comprising a scanning reflector mounted upon a rotatable tubular shaft and forming an acute angle in relationship to the longitudinal axis of said shaft, a flexible shaft, said flexible shaft secured to said tubular shaft and imparting rotary motion thereto, rotary and pivotal bearings for said tubular shaft at an end adjacent to said scanning reflector, an eccentrically driven rotary bearing for the other end of said tubular shaft, means for simultaneously rotating said rotatable tubular shaft and said eccentrically driven bearing in opposite directions at the same rate of speed, a bridge circuit network, and a plurality of thermal-sensitive elements forming arms of said bridge network, said elements situated in the focal plane region of said parabolic reflector so that said parabolic reflector may direct said thermal image upon members of said element plurality in succession.

3. In a scanning system, for elliptically scanning an area at a predetermined scan rate to detect a target situated therein the combination of, a rotatable shaft, means for rotating said shaft, a plane reflector for scanning said area and collecting radiant-energy emanating therefrom, said reflector mounted upon said shaft at an acute angular displacement in relation to the longitudinal axis of said shaft, means for obtaining a conical and rotary displacement of said longitudinal axis in a direction opposite to that of the shaft rotation as said shaft revolves, a parabolic reflector situated to receive the collected radiation from said plane reflector, an element sensitive to radiant-energy situated in the focal plane region of said parabolic reflector and comprising a plurality of sections each of which forms an arm of a bridge network, means under control of said element for producing a first electromotive force related in polarity to the bearing of said target relative to said element, means for producing a second electromotive force in phase with said first electromotive force, an oscilloscope system including electron beam producing means, beam deflection means and a screen, and means for connecting said first and second electromotive forces to said beam deflection means so that a signal appears on said screen, said signal appearance position being indicative of the bearing of said target relative to said scanning system.

4. In a thermal-energy system, for elliptically scanning an area to detect a temperature anomaly situated therein the combination of, a rotatable shaft, means for rotating said shaft, a plane reflector for scanning said area and collecting thermal radiation emanating therefrom, said plane reflector mounted upon said shaft at an acute angular displacement in relation to the shaft longitudinal axis, means for obtaining a rotary conical displacement of said axis in a direction opposite to the shaft rotation, a parabolic reflector situated to receive the collected radiation from said plane reflector, a multisectioned element sensitive to thermal-energy radiations, said element situated in the focal plane region of said parabolic reflector, a bridge circuit containing said element, means in said circuit for originating a voltage variation corresponding to variations in the amounts of said collected radiation, generating means for producing an electromotive output, said output in fixed time relation with said voltage variation, an oscilloscope system including beam producing means, beam deflection means and a screen, and means for impressing said voltage variation and said electromotive output upon said deflection means whereby a signal indication appears upon said screen, said indication related in its positioning on said screen to the bearing of said anomaly in respect to a datum point in said thermal-energy system.

5. In a radiant-energy scanning system the combination of, a rotatable tubular shaft, a scanning reflector mounted upon said shaft and disposed at an acute angle with respect to the longitudinal axis of said shaft, rotary and pivotal bearings for said tubular shaft at an end adjacent to said scanning reflector, an eccentrically driven rotary bearing for the other end of said tubular shaft, a flexible shaft secured to said tubular shaft, means for generating an electromotive output, said generating means including a rotor connected to said flexible shaft, and means for simultaneously rotating said flexible shaft and eccentrically driven bearing in opposite directions.

6. In a radiant-energy scanning system the combination of, a rotatable tubular shaft, a scanning reflector mounted upon said shaft and forming an acute angle in a relationship to the longitudinal axis of said shaft, a rotatable flexible shaft, said flexible shaft mechanically connected to said hollow shaft, rotary and pivotal bearings for said tubular shaft at and end adjacent to said scanning reflector, an eccentrically driven rotary bearing for the other end of said tubular shaft, and means for rotating said rotatable flexible shaft and said eccentrically driven rotary bearing simultaneously in opposite directions.

7. In a radiant-energy scanning system for elliptically scanning an area to detect an anomaly situated therein the combination of, a flat-surfaced reflector mounted upon a rotatable shaft and forming an acute angle in relationship to the longitudinal axis of said shaft, means for rotating said shaft, means for displacing the longitudinal axis of said shaft so that one point on said axis remains in a relatively fixed position and another point on said axis moves in a direction opposite to that of said rotating means and follows a closed curve in its movement in space.

8. In a radiant-energy scanning system for elliptically scanning an area to detect an anomaly situated therein the combination of, a rotatable shaft, means for rotating said shaft, a reflector mounted upon said shaft and disposed at an acute angle in reference to the longitudinal axis of said shaft, means for obtaining a rotary displacement of said longitudinal axis in a direction opposite to that of the shaft rotation whereby a line including a selected portion of said longitudinal axis generates a cone as said shaft revolves.

9. In a radiant-energy scanning system for elliptically scanning an area to detect an anomaly situated therein, the combination of, a tubular shaft, a reflector secured to said tubular shaft in a manner such that the plane of the reflector forms an acute angle with respect to the axis of said tubular shaft, rotary and pivotal bearings for said tubular shaft at an end adjacent to said reflector, an eccentrically driven rotary bearing for the other end of said tubular shaft, a flex ble shaft secured to said tubular shaft and imparting rotary motion thereto, motor means, and power transmitting means connected to said motor means for driving said flexible shaft and said eccentrically driven bearing in opposite d.rections at speeds having a predetermined ratio.

10. In a radiant-energy scanning system for elliptically scanning an area to detect an anomaly situated therein, the combinat:on of, a flat-surfaced reflector mounted upon a rotatable shaft and forming an acute angle in relationship to the longitudinal axis of said shaft, means for rotating said shaft, and means for obtaining a cyclic conical displacement of said axis in a direction opposite to that of said shaft rotation.

References Cited in the file of this patent

UNITED STATES PATENTS

| | | |
|---|---|---|
| 1,824,731 | Moore | Sept. 22, 1931 |
| 2,410,831 | Maybourduk et al. | Nov. 12, 1946 |
| 2,419,024 | Iams | Apr. 15, 1947 |
| 2,431,625 | Tolson | Nov. 25, 1947 |
| 2,442,824 | Polye | June 8, 1948 |
| 2,457,562 | Karleen | Dec. 28, 1948 |